Mar. 6, 1923.

W. P. LOUDON 1,447,797

RELIEF MECHANISM FOR STORAGE BATTERIES

Original Filed Apr. 20, 1918

WITNESS:

INVENTOR.
Warren P. Loudon.
BY
ATTORNEY.

Patented Mar. 6, 1923.

1,447,797

UNITED STATES PATENT OFFICE.

WARREN P. LOUDON, OF SPRINGFIELD, MASSACHUSETTS, ASSIGNOR TO U. S. LIGHT & HEAT CORPORATION, OF NIAGARA FALLS, NEW YORK, A CORPORATION OF NEW YORK.

RELIEF MECHANISM FOR STORAGE BATTERIES.

Application filed April 20, 1918, Serial No. 229,846. Renewed May 9, 1921. Serial No. 467,931.

*To all whom it may concern:*

Be it known that I, WARREN P. LOUDON, a citizen of the United States, residing at Springfield, in the county of Hampton and State of Massachusetts, have invented new and useful Improvements in Relief Mechanism for Storage Batteries, of which the following is a specification.

The present invention relates to relief mechanism for storage batteries.

In storage battery cells which in service are liable to be carried in a number of different positions as, for instance, in aeroplane service or signal service, it is necessary to provide means for preventing the escape of electrolyte from a cell when said cell is tilted from its normal position to a predetermined degree.

An object of the present invention is to provide means permitting the escape of gases from a storage battery cell but which will prevent the escape of electrolyte should the cell be turned to a predetermined angle or turned up-side-down.

A further object is to provide a relief mechanism which is simple in construction and inexpensive to manufacture.

Further objects will appear as the description proceeds.

Referring to the drawings:—

Figure 1:
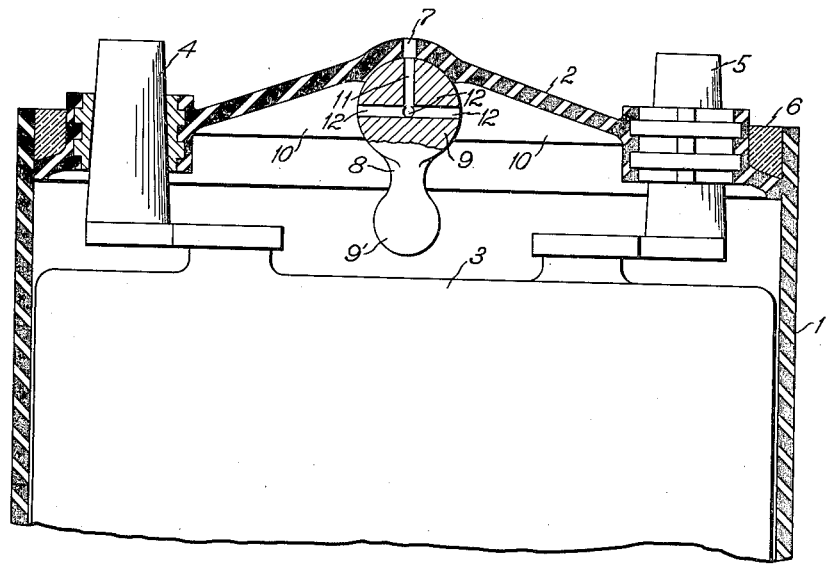
Fig. 1 represents in sectional elevation one embodiment of the present invention.

The numeral 1 represents the side walls of a storage battery cell, which cell is closed by the cover 2. Within the cell are the groups of active elements indicated by the numeral 3. Plates of opposite polarity will be conducted to the exterior of the cell through the cell posts 4 and 5. The construction of the groups of active elements 3 and the cell posts 4 and 5 have no material bearing upon the present invention, and will not be described herein. It will be sufficient to state that the cell posts 4 and 5 should be so mounted as to seal the cell to prevent the escape of electrolyte along said post, should the cell be tilted to a predetermined angle. The edges of the cover 2 should also be sealed to the cell walls 1 as, for instance, by means of sealing compound 6.

Located preferably centrally of the cover 2 is an aperture 7 which provides a passage-way whereby gases may escape from the interior of the cell. Of course, a filling and inspection aperture with cap must be provided, but said cap will tightly seal the cell whereby said aperture 7 will be the only opening from the interior of the cell to the exterior thereof. This opening should be closed at the time when there will be any tendency for the electrolyte to pour from the cell. For this purpose a valve member 8 is provided which, according to the embodiment illustrated in Fig. 1, comprises a weighted member having a portion which is substantially spherical in outline. Said spherical portion is indicated by the numeral 9. Said spherical portion 9 has a weighted portion 9' extending therefrom, whereby said weighted portion 9' will bias the valve member 8 to a predetermined position. According to Fig. 1, the spherical portion 9 is moulded into the cover 2, being supported by ribs 10, 10, which form a part of said cover. Said cover 2 should provide a close fitting bearing for the spherical portion 9, for reasons which will appear hereinafter. The spherical portion 9 is provided with a passage-way 11 adapted, when the valve member 8 is in its normal position, to communicate with the aperture 7. Other passage-ways 12 communicate with the passage-way 11 and also communicate with the interior of the cell. As illustrated in Fig. 1, the passage-ways 12 radiate from the passage-way 11 in a plane substantially normal to the axis of said passage-way 11. It will be understood, of course, that any other lay-out of the passage-ways 12 may be provided. Preferably, they should extend in several directions from the passage-way 11, whereby there will always be an opening whereby communication will always be had from the passage-way 11 to the interior of the cell.

It should be evident from the description above that when the cell is in upright position, gases may escape from the interior of the cell through passage-ways 12, passage-way 11 and aperture 7 to the exterior of the cell. Should the cell be tilted to a predetermined angle, the weighted portion 9' will cause the spherical portion 9 to slide within the cover 2 whereby the passage-way 11 will be moved out of communication with the aperture 7. A sufficiently tight fit will be provided between the spherical portion 9 and the cover 2 whereby to prevent the passage of electrolyte therebetween. The escape of electrolyte will therefore be effectually prevented. Though the spherical portion 9 should fit closely within the cover 2 so as to prevent the passage of electrolyte therebetween, it should slide easily relative to said cover 2, whereby when the cell is tilted, the cover 2 will slide relative to the spherical portion 9. When the cell has been tilted to a predetrmined degree, aperture 7 will be moved out of communication with passage-way 11, whereby passage-way 11 will be stopped and escape of the electrolyte will be prevented.

Figure 2:
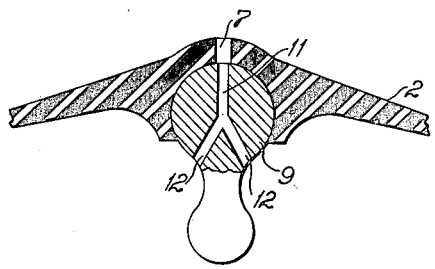

In the embodiment illustrated in Fig. 2, the ribs 10 are dispensed with, the spherical portion 9 of the valve member being molded within the cover 2 in such a way that the cover 2 fits the spherical member 9 over a considerable portion of a sphere. In order to render this construction possible, the passage-ways 12, 12, extend from the passage-way 11 along axes which form angles which are relatively obtuse to the axis of passage-way 11. When the cell is tilted to a predetermined angle, the aperture 7 is moved out of communication with passage-way 11, whereby said passageway is stopped to prevent the escape of electrolyte.

Figure 3:
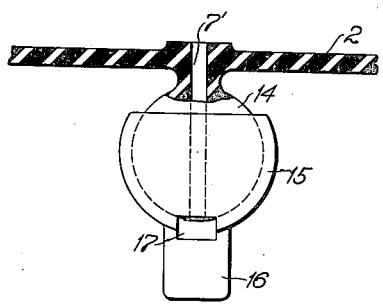
Figs. 2 and 3 represent modifications.

In the modification illustrated in Fig. 3, the cover 2 is provided with a depending boss portion 14. The boss portion 14 will assume the outline of a sphere and will be provided with an aperture 7' extending in a vertical direction through its center and through the cover 2. Molded around the spherical boss is a globe 15 which encloses the member 14 throughout a considerable portion of its outline. The globe 15 is provided with a weighted portion 16 which tends to hold the globe member 15 in a predetermined position. The globe member 15 is provided with an aperture 17 which, when the cell is in its normal upright position, will communicate with the aperture 7'. If the cell is turned to a predetermined angle, the weighted portion 16 will move the globe 15 to a position whereby said globe 15 will close the aperture 7' to prevent the escape of electrolyte.

The embodiments of the present invention which have been chosen for illustration should not be considered in a limiting sense. Many modifications will occur to those skilled in the art. It is intended in this patent to cover all such modifications that come within the scope of the invention as defined in the appended claims.

What I claim as new and desire to secure by Letters Patent of the United States, is—

1. In a battery cell, in combination, a cell cover provided with an aperture, valve means adapted under certain circumstances to obstruct said aperture, said valve means being provided with a depending weight to hold said valve means in unobstructing position when said cell is in an upright position.

2. In a battery cell, in combination, a cell cover provided with an aperture, a sliding member provided with a vent and a depending weight adapted to hold said vent in communication with said aperture when said cell is upright and to move said sliding member into obstructing relation to said aperture when said cell is tilted at a predetermined angle.

3. In a battery cell, in combination, a cell cover provided with an aperture, a sliding member partially embedded in said cover and having sliding engagement therewith, said member having a vent and a weight for moving said sliding member relative to said cover in response to the tilting of said cell.

4. In a battery cell, in combination, a cell cover provided with an aperture, a sliding member partially embedded in said cover and having sliding engagement therewith, said member being provided with passage-ways, one of which is adapted to register with said aperture and the others of which communicate with the interior of said cell, said sliding member being provided with a weight for moving same relative to said cover in response to the tilting of said cell.

5. In a battery cell, in combination, a cell cover provided with an aperture, a sliding member partially embedded in said cover and having sliding engagement therewith, said member being provided with passage-ways, one of which is adapted to register with said aperture when said cell is in an upright position, the other of which passage-ways communicate with said one passage-way and with the interior of said cell, said sliding member being also provided with a weight to hold same in a position to obstruct said aperture when said cell is tilted to a predetermined angle.

In witness whereof, I have hereunto subscribed my name.

WARREN P. LOUDON.